United States Patent [19]
Chumley

[11] Patent Number: 5,887,879
[45] Date of Patent: Mar. 30, 1999

[54] CART ASSEMBLY AND METHODS

[76] Inventor: Kenneth David Chumley, 835 Lightwood Knot Rd., Woodruff, S.C. 29388

[21] Appl. No.: 908,738

[22] Filed: Aug. 7, 1997

Related U.S. Application Data

[63] Continuation of Ser. No. 575,149, Dec. 19, 1995, abandoned.

[51] Int. Cl.$^6$ ................ B62B 1/00; B62B 1/04; B62B 1/06
[52] U.S. Cl. ................ 280/40; 280/651; 280/652; 280/42; 280/47.24
[58] Field of Search ................ 280/39, 40, 651, 280/652, 646, 655, 47.17, 47.24

[56] References Cited

U.S. PATENT DOCUMENTS

| | | | |
|---|---|---|---|
| 669,222 | 3/1901 | Ruher | 280/40 |
| 1,409,838 | 3/1922 | Emery et al. | 280/40 |
| 2,802,672 | 8/1957 | D'angelo | 280/40 |
| 3,865,392 | 2/1975 | Hartway | 280/40 |
| 4,215,877 | 8/1980 | Pritchett | 280/652 |
| 4,917,392 | 4/1990 | Ambasz | 280/40 |
| 5,072,958 | 12/1991 | Young | 280/655 |
| 5,127,662 | 7/1992 | Spak | 280/40 |
| 5,226,666 | 7/1993 | Dinkens, Jr. | 280/652 |
| 5,263,727 | 11/1993 | Libit et al. | 280/655 |
| 5,328,192 | 7/1994 | Thompson | 280/47.24 |
| 5,330,212 | 7/1994 | Gardner | 280/40 |
| 5,803,471 | 9/1998 | DeMars et al. | 280/40 |

*Primary Examiner*—Brian L. Johnson
*Assistant Examiner*—Faye M. Fleming
*Attorney, Agent, or Firm*—Ralph Bailey

[57] ABSTRACT

A portable assembly for compact storage and to facilitate portability wherein a body is constructed of longitudinal parallel transversely aligned tubular frame members (A) for telescopically positioning an extensible handle (B) with brackets (C) being moved for longitudinally sliding movement on longitudinal body members (A) for carrying wheels (D) which are locked in position opposite each other beneath a medial portion of the load utilizing fasteners (E) without the necessity for utilizing a transverse axle.

4 Claims, 2 Drawing Sheets

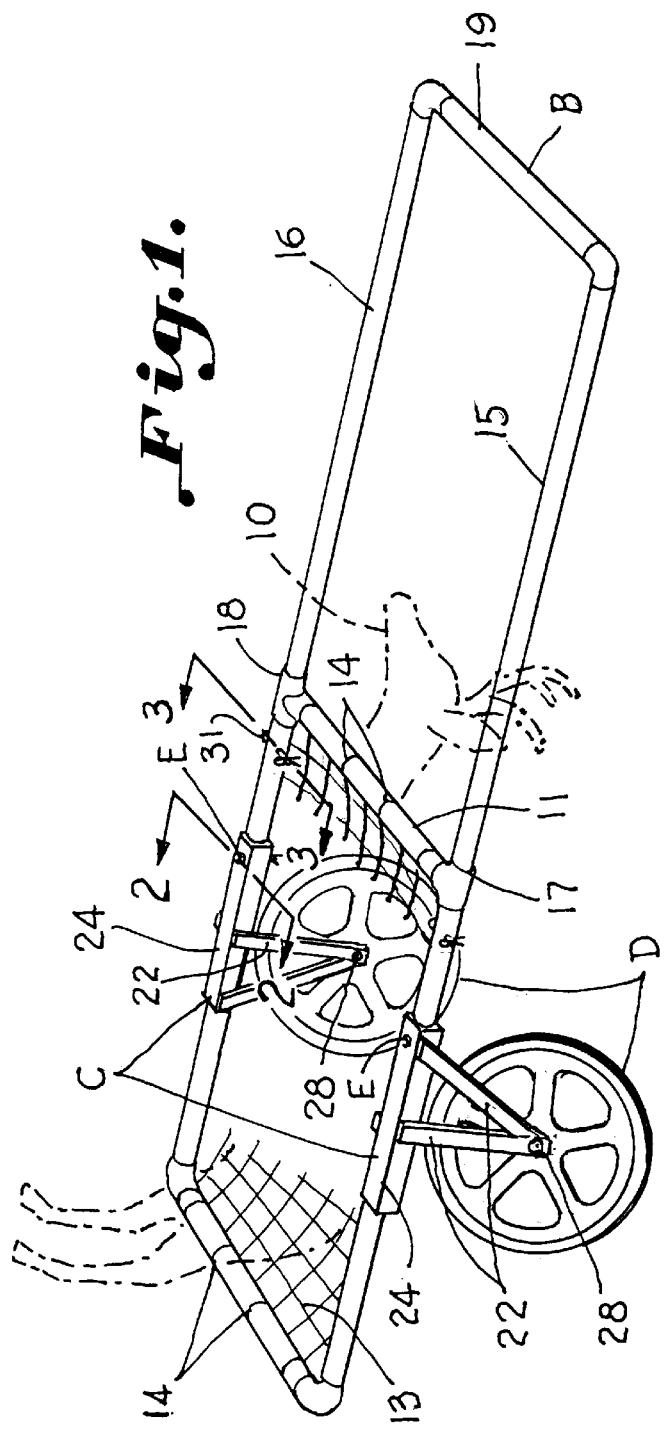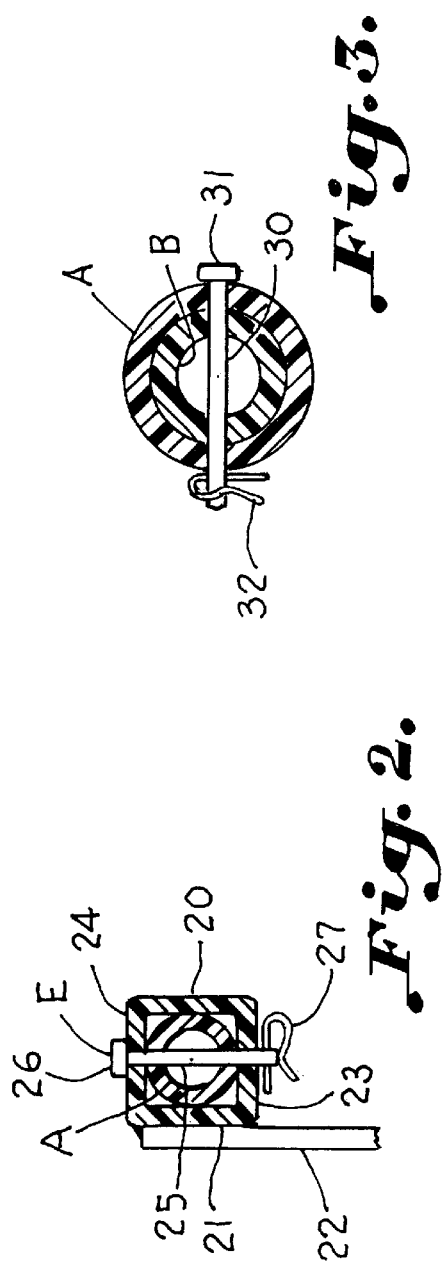

CART ASSEMBLY AND METHODS

This application is a continuation of application Ser. No. 08/575,149 filed Dec. 19, 1995 now abandoned.

BACKGROUND OF THE INVENTION

This invention relates to a load bearing cart which is collapsible into a compact package which is light and conveniently carried.

The prior art includes U.S. Pat. No. 4,063,744 which discloses a collapsible carrier for camp packs as well as game having a single centrally located large diameter wheel and having removable handle bars which are storable within the collapsed assembly for enhanced portability. U.S. Pat. No. 4,444,405 illustrates a cart having one large centrally located wheel which has shock absorbing means as well as a mileage meter for use on rough terrain.

An important aspect of the present invention involves its use in connection with carrying game such as a deer or even larger game which has been killed in the woods and in such terrain as to be inaccessible by motorized vehicles. The task of removing large game from such terrain is generally a two-man job wherein each man carries one end of a horizontal pole from which the animal is suspended. Game carriers have been provided having some limited collapsibility but generally being of a type configured in such a manner as a hand cart with relatively larger wheels. Carts with single wheels at one end as well as sleds have also been utilized for this purpose.

The devices of the prior art have been relatively ineffective in providing a practical means for transporting large game as a one man operation. The single wheeled devices are difficult to balance and are bulky when an attempt is made to carry them and are relatively of expensive construction. Such devices are generally incapable of utilization for any other purpose except transport of game or camping equipment. A more versatile device which is light and collapsible into a suitable package may be useful in lieu of the hand carts wherein wheels are fixed adjacent a lower corner, and wherein inexpensive means may be used for transporting loads such as layers of sod, sacks of grain, vegetables or construction materials including concrete blocks and the like.

SUMMARY OF THE INVENTION

Accordingly, it is an important object of this invention to provide an assembly which is portable fitting into relatively close quarters and being light weight as may be readily assembled by one person for carrying game or other loads including camping equipment and the like.

Another object of the invention is to provide an all purpose cart which may be inexpensively manufactured and readily assembled and disassembled.

Another important object of the invention is to provide a collapsible cart constructed of light weight material preferably such as plastic or aluminum having a telescopic handle carried by a horizontal body having wheels carried by brackets for folding into side by side relation on the body and yet being adjustable for positioning in a generally central location in respect to the load in transversely aligned relation for bearing a load.

It has been found that a useful portable cart assembly may be provided utilizing light weight tubular structure members which may be round or square in cross-section for constructing a body having sides carrying a handle in telescopic relation thereto and which has wheel carrying brackets for longitudinal movement on the body and which are folded upwardly positioning the wheels in side by side relation for enhancing the portability of the assembly.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 1 is a perspective view illustrating a cart with the parts of the assembly positioned in operable position for carrying a load;

FIG. 2 is a transverse sectional elevation taken on the line 2—2 in FIG. 1 illustrating fastening means for securing the respective brackets to the side frame members for positioning the wheels opposite each other and beneath a medial position of the load for maintaining the wheels in alignment without the necessity of using a transverse axle therebetween;

FIG. 3 is a transverse sectional elevation taken on the line 3—3 in FIG. 1 illustrating fastening means for securing the handle in extended position as illustrated in FIG. 1;

DESCRIPTION OF A PREFERRED EMBODIMENT

Figure 5:
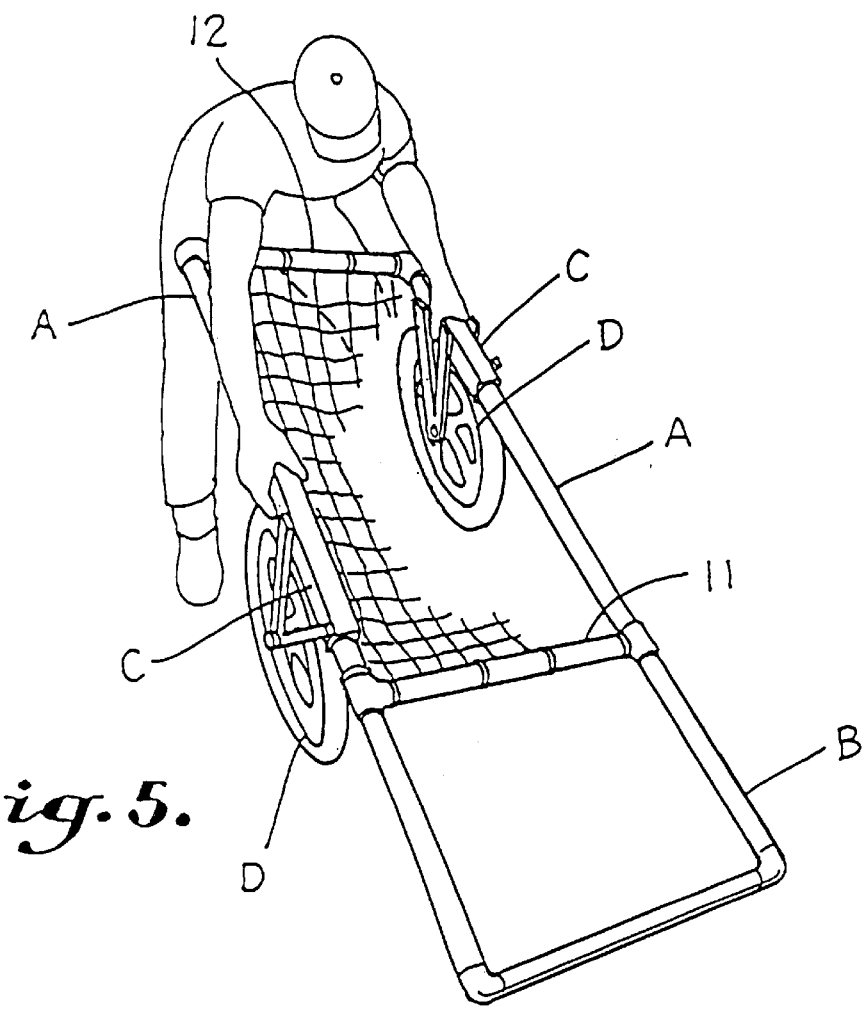
FIG. 5 is a perspective view illustrating the sliding of the wheel carrying brackets on the longitudinal frame members preparatory in maintaining them in a side by side relation as illustrated in FIG. 4.

A portable load bearing cart assembly has an elongated horizontal body including a pair of elongated longitudinal transversely aligned side members A constructed of tubular structural material. Open ends are presented by the side elongated longitudinal aligned members forming said body for receiving a handle B having elongated longitudinal aligned members free on one end carried in open ends presented by the elongated longitudinal members for sliding movement thereon. A pair of brackets C are slidable longitudinally and rotatable on respective elongated longitudinal aligned members. A large diameter wheel D is carried by each bracket having a diameter comparable to the width of the cart. Fastening devices E position the brackets in a fixed intermediate position on respective elongated longitudinal aligned members opposite each other. Thus, the brackets and wheels may be folded up adjacent the body in side by side relation with said handle telescoped inwardly of the body for portability and assembled with the handle extended and the wheels adjacent the center of a load.

Referring more particularly to FIG. 1, the cart assembly is illustrated with the parts assembled or positioned in such fashion as to carry large game such as a deer which is shown in broken lines as at 10 being carried upon the body A with the wheels D being carried thereon without the necessity of using a transverse axle connecting the wheels. The body includes the transverse aligned side members A as well as front and rear bridging members 11 and 12, respectively. A suitable platform, albeit flexible, is illustrated as including a net 13 suitably connected as by ties 14 to the respective bridging members 11 and 12. Any suitable platform may be employed including a panel, expanded metal, canvas, and the like. The frame and handle portions as well as the wheels and brackets constituting the cart are preferably constructed of plastic or light weight metal such as aluminum although any light weight structural material may be employed. The handle B is illustrated as having a pair of tubular members 15 and 16 which are parallel and transversely aligned and horizontally positioned for telescopic reception in the respective elongated transverse aligned side members A which have open ends illustrated at 17 and 18, respectively, for receiving the free ends of the handle members 15 and 16. The other end of the handle B is bridged as at 19.

The brackets C are best illustrated in FIG. 2 as having a square cross-section with opposed sides 20 and 21. The side member 21 is illustrated as carrying a bracket member 22 suitably fixed thereto for carrying a wheel. The brackets are rotably mounted on the tubular side members A and upper and lower members 23 and 24 are provided between the sides for completing the bracket section and for carrying fastening devices E which include a pin 25 having a head 26 on one end and for receiving a suitable fastener such as a cotter pin 27 on the other end for securing the wheels D in adjusted downward position opposite each other on the body medially of the load and preferably of the body depending on the position of the load. The bracket members 22 are illustrated in FIG. 1 as being secured on one end to the bracket C and on the other end to respective stub shafts 28 for securing the respective large wheels in load carrying position as illustrated in FIG. 1.

Referring more particularly to FIG. 3, it will be observed that the handle members B are illustrated as being fixed with respect to the aligned side members A by means of a pin 30 having a head 31 and receiving a cotter pin 32 on the other end for maintaining the handle in extended position for transporting a load.

Figure 4:
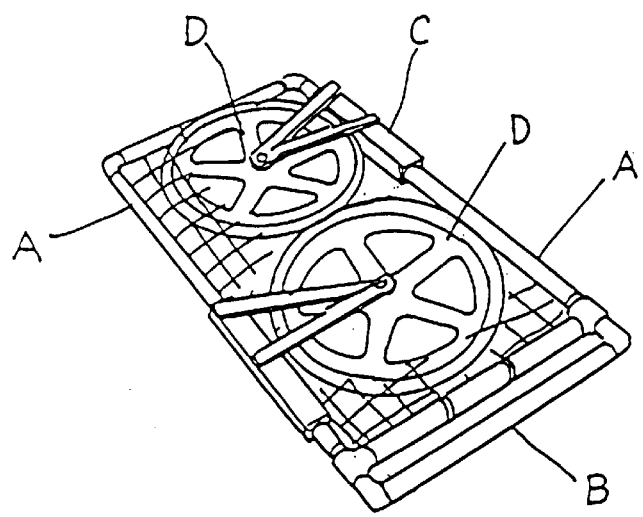
FIG. 4 is a perspective view illustrating the assembly in collapsed configuration with the wheels raised in side by side relation to facilitate storage and transport enhancing the portability of the apparatus.

Referring more particularly to FIG. 4, it will be noted that the respective brackets C are positioned in extreme forward and rear positions on respective transversely aligned side members A. In order to collapse the assembly to carrying position as illustrated in FIG. 5 the wheels and the brackets carried thereby are first removed to the forward and rear position described above. The fastening means E are removed to permit the sliding of the brackets C on the side members A but they may also be used to secure the brackets C in collapsed position as in FIG. 4. The handle B may be likewise secured in retracted position. The bracket and the wheels are then folded upwardly in order to rest in a side by side relation as illustrated in FIG. 5 within the horizontal body of the cart. Likewise the handle is telescoped inwardly after removing the pin 30 so as to collapse the assembly into a configuration which is easily handled and which may be fitted into a relatively small space such as the back seat of an automobile. The components are assembled in operable position as shown in FIG. 1 by extending and fixing the handle B and then aligning the brackets C and wheels carried thereby in load carrying position on an intermediate portion of the body for bearing a load substantially balanced thereon to facilitate transport of the load in generally horizontal position. Any suitable fastening means may include detents or spring loaded pins and the like.

While a preferred embodiment of the invention has been described using specific terms, such description is for illustrative purposes only, and it is to be understood that changes and variations may be made without departing from the spirit or scope of the following claims.

What is claimed is:

1. A portable load bearing cart assembly comprising:

an elongated horizontal body having a pair of elongated longitudinal transversely aligned side members constructed of structural material;

an elongated handle carried on said elongated horizontal body for longitudinal adjustment thereon;

a pair of brackets slidable longitudinally on respective elongated longitudinal aligned side members;

a wheel foldably carried by each bracket having a diameter comparable to the width of the cart receivable adjacent said body when said brackets and wheels carried thereby are moved adjacent respective ends of said body;

a net extending across and aligned on said body for receiving a load thereacross; and fastening devices adjustably positioning said brackets in fixed intermediate positions on respective elongated longitudinal aligned members opposite each other for bearing a load on said wheels;

whereby said brackets and wheels may be folded up in longitudinal alignment adjacent said body with said handle carried in a retracted position thereon for transport and assembled with the handle extended and with the wheels in an intermediate portion of the body tending to balance a load with the body in a generally horizontal position for transporting a load.

2. The structure set forth in claim 1 wherein said handle includes a pair of longitudinal aligned members telescopically received on one end within said longitudinal side members, and a bridging member connecting the longitudinal aligned members on the other end.

3. The method of assembling a portable load bearing cart comprising the steps of:

providing an elongated horizontal body having a pair of elongated longitudinal transversely aligned side members constructed of structural material;

extending an elongated handle carried by said elongated longitudinal body from a retracted position thereon;

providing a pair of wheels carried by respective slidable brackets each wheel having a diameter comparable to the width of the cart receivable adjacent said body when said brackets and wheels carried thereby are positioned adjacent respective ends of said body;

folding said wheels downwardly from a position adjacent the body;

sliding each of said brackets longitudinally on respective elongated longitudinal aligned side members toward a position in transverse alignment in an intermediate portion of said body, one of said brackets being moved toward the handle;

locking said brackets in a fixed intermediate use position on respective elongated longitudinal aligned members, with said wheels down in transverse alignment opposite each other;

whereby said brackets and wheels may be folded up adjacent said body with said handle carried in retracted position thereon for transport and assembled with the handle extended and with the wheels in an intermediate portion of the body tending to balance a load in substantially horizontal position during transport of the load.

4. The method set forth in claim 2 including the steps of telescopically carrying said handle on said body, and fixing said handle in respect to said body in extended position.

* * * * *